(12) United States Patent
Suzuki

(10) Patent No.: US 7,081,717 B2
(45) Date of Patent: Jul. 25, 2006

(54) DISCHARGE LAMP LIGHTING APPARATUS FOR LIGHTING MULTIPLE DISCHARGE LAMPS

(75) Inventor: Shinichi Suzuki, Iwata-gun (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 11/151,210

(22) Filed: Jun. 14, 2005

(65) Prior Publication Data

US 2006/0012314 A1    Jan. 19, 2006

(30) Foreign Application Priority Data

Jul. 16, 2004    (JP) .............................. 2004-210116

(51) Int. Cl.
*H05B 37/02* (2006.01)
(52) U.S. Cl. ...................... 315/213; 315/215; 315/220; 315/308
(58) Field of Classification Search ............ 315/209 R, 315/210, 213, 215, 219, 220, 224–226, 276–277, 315/279, 287, 291, 299, 307–308, 312, 324
See application file for complete search history.

(56) References Cited

U.S. PATENT DOCUMENTS

| | | | | |
|---|---|---|---|---|
| 5,844,540 | A | 12/1998 | Terasaki | ...................... 345/102 |
| 6,016,052 | A | 1/2000 | Vaughn | ....................... 323/355 |
| 6,064,160 | A | 5/2000 | Nakamura | ................... 315/291 |
| 6,108,220 | A * | 8/2000 | Franke | ........................ 363/37 |
| 6,259,615 | B1 | 7/2001 | Lin | ............................. 363/98 |
| 6,515,427 | B1 * | 2/2003 | Oura et al. | .................. 315/141 |
| 6,570,344 | B1 * | 5/2003 | Lin | ............................ 315/224 |
| 6,680,588 | B1 * | 1/2004 | Park et al. | ................... 315/312 |
| 6,774,579 | B1 * | 8/2004 | Abe | ........................... 315/219 |
| 6,956,555 | B1 * | 10/2005 | Kyomoto | .................... 345/102 |
| 2003/0043097 | A1 | 3/2003 | Shingai et al. | ................ 345/87 |
| 2003/0234762 | A1 | 12/2003 | Nakatsuka et al. | ......... 345/102 |

FOREIGN PATENT DOCUMENTS

| | | |
|---|---|---|
| EP | 1 395 095 A1 | 3/2004 |
| EP | 1 397 028 A1 | 3/2004 |
| JP | A 2002-043088 | 2/2002 |
| JP | A 2002-110393 | 4/2002 |
| WO | WO 2004/059826 A1 | 7/2004 |

* cited by examiner

*Primary Examiner*—Thuy Vinh Tran
(74) *Attorney, Agent, or Firm*—Oliff & Berridge, PLC

(57) ABSTRACT

A discharge lamp lighting apparatus for lighting a plurality of discharge lamps comprises: a control circuit adapted to output driving signals; a plurality of step-up transformers; and a plurality of bridge circuits, each of which is connected to a DC power supply, and drives the primary side of each of the step-up transformers according to the driving signals from the control circuit so as to light each of the discharge lamps connected respectively to the secondary sides of the step-up transformers. In the discharge lamp lighting apparatus, each of the bridge circuits is connected to the control circuit via synchronous switching elements, and the synchronous switching elements, according to each of synchronizing signals applied thereto, switch on and off the driving signals from the control circuit so as to controllably cause each of the bridge circuits to start and stop its operation.

8 Claims, 4 Drawing Sheets

DISCHARGE LAMP LIGHTING APPARATUS FOR LIGHTING MULTIPLE DISCHARGE LAMPS

BACKGROUND OF THE INVENTION

1. Field of the Invention

The present invention relates to a discharge lamp lighting apparatus, and more particularly to a discharge lamp lighting apparatus adapted to light multiple discharge lamps for use as a backlight in a liquid crystal display apparatus.

2. Description of the Related Art

A liquid crystal display (LCD) apparatus is extensively used in electronics devices, and is increasingly superseding a cathode ray tube (CRT) in a relatively large-screen display apparatus such as a personal computer, and a TV set. In such a large-screen LCD apparatus, a backlight system provided with a plurality of discharge lamps is generally used in order to ensure a sufficient display brightness and also uniformity in the brightness, and the discharge lamps are usually driven by a discharge lamp lighting apparatus having an inverter circuit.

Such an LCD apparatus advantageously has a thinner profile and lower power consumption than a CRT conventionally used, but incurs a deteriorated image quality due to a blurred outline in a movie display. Specifically, in the LCD apparatus which is a hold-type display apparatus, the brightness of each pixel is held substantially constant throughout a frame period until an image data of a subsequent frame period is displayed. Consequently, when the outline of a moving object is followed, an observer recognizes an image produced such that gradation values at surrounding areas of respective outlines over several frame periods are synthesized, and it looks to the observer that the outline is blurred. On the other hand, in the CRT which is an impulse-type display, the brightness of each pixel is attenuated in a frame period, and therefore the observer is kept from recognizing gradation values at surround areas of respective outlines as synthesized at the transition time from one frame period to the next frame period, thus keeping off the blurred outline problem described above.

In addressing the problem, a backlight is blinked during one frame period thereby realizing an impulse-type light emission in an LCD apparatus (refer to, for example, Japanese Patent Application Laid-Open No. 2002-110393). Specifically, a plurality of discharge lamps constituting a backlight are arranged parallel to scanning lines of a screen, and some thereof corresponding to a partial region of the screen are turned on in a frame period and then turned off after a predetermined time in the same frame period thus performing a blinking operation. The blinking operation is sequentially repeated in synchronization with the scanning lines to sequentially cover a plurality of partial regions (such a operation is referred to as "blinking lighting"), whereby the problem of a blurred outline is reduced or eliminated. In order to perform such a blinking lighting, a discharge lamp lighting apparatus must be capable of controllably lighting on and off the plurality of discharge lamps individually.

FIG. 3 is a circuitry of a conventional discharge lamp lighting apparatus 100 employing inverters to perform a blinking lighting. The discharge lamp lighting apparatus 100 includes step-up transformers T1 to Tn, discharge lamps La1 to Lan connected respectively to the secondary sides of the step-up transformer T1 to Tn, and inverters INV1 to INVn connected respectively to the primary sides of the step-up transformer T1 to Tn and adapted to light the discharge lamps La1 to Lan. The inverters INV1 to INVn are separate oscillating inverters each including a control circuit 101 with a control IC, and a bridge circuit 102. The control circuit 101 drives the bridge circuit 102 thereby generating an AC voltage at the primary side of each of the step-up transformers T1 to Tn, then a high voltage is induced at the secondary side of each of the step-up transformers T1 to Tn, and the discharge lamps La1 and Lan are lighted by respective high voltages induced. Lamp current detecting resistors R1 to Rn are provided respectively at the secondary sides of the step-up transformers T1 to Tn, and voltage values thereof are fed back to the control circuit 101 via respective diodes D1 to Dn, whereby lamp currents flowing through respective discharge lamps La1 to Lan are maintained at a prescribed value. Control IC's of respective control circuits 101 have input terminals for synchronizing signals P1 to Pn and cause respective bridge circuits 102 to start and stop their operations according to the synchronizing signals P1 to Pn, whereby the discharge lamps La1 to Lan are individually lighted on and off.

FIG. 4 is a circuitry of another conventional discharge lamp lighting apparatus 200 with a blinking lighting operation. The discharge lamp lighting apparatus 200 includes a DC-DC converter 201, a plurality of discharge lamps La1 to Lan, and a plurality of inverters INV1 to INVn. The inverters INV1 to INVn are self oscillating inverters each including a corrector resonance Royer circuit 202 including a step-up transformer T1, and its operating voltage is controlled and maintained by the DC-DC converter 201. In the Royer circuit 202, a bias voltage is supplied to switching elements Q7 and Q8 via a switching element Q9, and the Royer circuit 202 is caused to start and to stop its operation by turning on and off the switching element Q9 according to a synchronizing signal P1/P2/ . . . /Pn, whereby the discharge lamp La1/La2/ . . . /Lan is lighted on and off.

The discharge lamp lighting apparatus 100 shown in FIG. 3 requires a plurality of control IC's in order to light on and off the plurality of discharge lamps, thus increasing the cost of the apparatus. The discharge lamp lighting apparatus 200 shown in FIG. 4, which does not requires a control IC and therefore is advantageous in cost compared to the apparatus 100, incurs a large loss due to heat generated, and the like, thus raising a problem in efficiency.

SUMMARY OF THE INVENTION

The present invention has been in light of the problems described above, and it is an object of the present invention to provide a discharge lamp lighting apparatus which realizes a blinking lighting inexpensively and efficiently.

In order to achieve the object described above, according to an aspect of the present invention, there is provided a discharge lamp lighting apparatus which comprises: a control circuit adapted to output driving signals; a plurality of step-up transformers; and a plurality of bridge circuits, each of which is connected to a DC power supply, and drives a primary side of each of the step-up transformer according to the driving signals from the control circuit so as to light each of a plurality of discharge lamps connected respectively to secondary sides of the step-up transformers. In the discharge lamp lighting apparatus described above, each of the bridge circuits is connected to the control circuit via synchronous switching elements, and the synchronous switching elements, according to each of synchronizing signals applied thereto, switch on and off the driving signals from the control circuit so as to controllably cause each of the bridge circuits to start and stop its operation.

In the aspect of the present invention, each of the bridge circuits may be a full-bridge circuit comprising series circuits which each include a pair of switching elements connected in series to each other, and which are connected in parallel to each other, and switching elements as low-side switches of each bridge circuit may be connected to the control circuit via the synchronous switching elements, respectively.

In the aspect of the present invention, a lamp current detecting unit may be provided at the secondary side of each step-up transformer, and an output signal from the current detecting unit may be fed to the control circuit via an OR circuit including a diode.

In the aspect of the present invention, the discharge lamp lighting apparatus may be incorporated in a backlight system of a liquid crystal display apparatus.

In the aspect of the present invention, the plurality of bridge circuits may be controlled so as to start and stop operation sequentially in synchronization with vertical scanning lines of the liquid crystal display apparatus.

According to the discharge lamp lighting apparatus of the present invention, since only one control circuit can controllably light on and off a plurality of discharge lamps, a blinking lighting operation is realized inexpensively by a highly efficient separate oscillating inverter, and the circuitry is simplified thus allowing the discharge lamp lighting apparatus to be readily downsized.

And also, due to only one control circuit controllably lighting on and off a plurality of discharge lamps as described above, a uniform brightness is achieved across the plurality of discharge lamps independent of variation in the reference voltage, or the like in the control circuit, and the plurality of discharge lamps are lighted with one same frequency thus causing no interference between the discharge lamps.

DETAILED DESCRIPTION OF THE PREFERRED EMBODIMENT

A preferred embodiment of the present invention will hereinafter be described with reference to the accompanying drawings.

Figure 1:
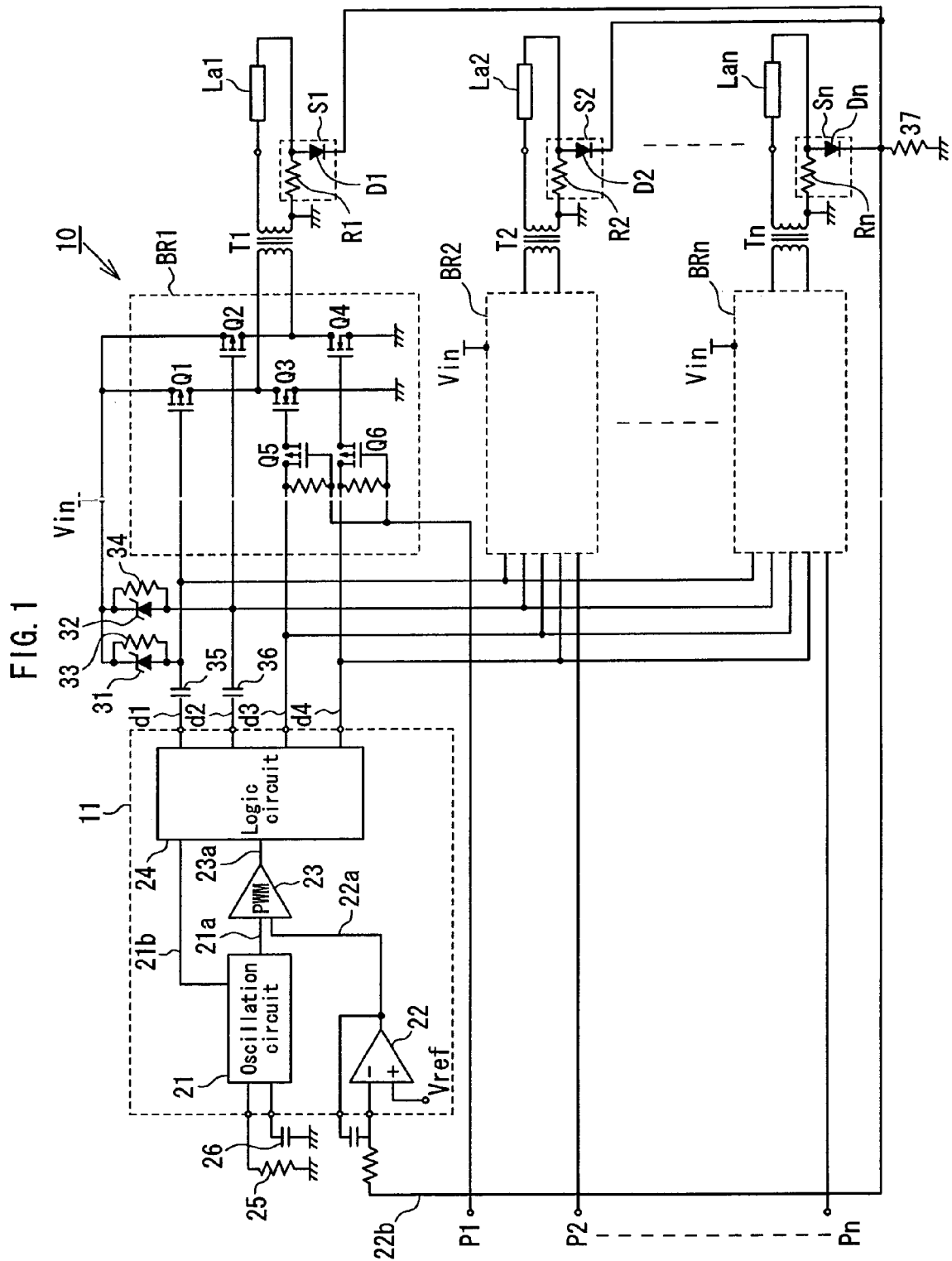
FIG. 1 is a circuitry of a discharge lamp lighting apparatus according to an embodiment of the present invention.

Referring to FIG. 1, a discharge lamp lighting apparatus 10 according to an embodiment of the present invention is for controllably lighting a plurality of discharge lamps (for example, cold-cathode tubes) La1 to Lan, and includes a control circuit 11, a plurality of bridge circuits BR1 to BRn, and a plurality of step-up transformers T1 to Tn.

Each of the bridge circuits BR1 to BRn includes a series circuit consisting of switching elements Q1 and Q3, and a series circuit consisting of switching elements Q2 and Q4, wherein the series circuits are connected in parallel to each other and have their one terminals connected to a DC power supply Vin and have the other terminals grounded, and the connection portion of the switching elements Q1 and Q3 and the connection portion of the switching elements Q2 and Q4 are connected respectively to both terminals of the primary side of each step-up transformer T1/T2/ . . . /Tn, thus constituting a full-bridge circuit. In the present invention, the switching elements Q1 and Q2 as high-side switches connected to the power supply are p-channel MOSFET's, the switching Q3 and Q4 as low-side switches grounded are n-channel MOSFETs, and each of the bridge circuits BR1 to BRn is connected to the control circuit 11 via lines for driving signals d1 to d4 to drive respective gate voltages of the switching elements Q1 to Q4. The low-side switching elements Q3 and Q4 are connected to the control circuit 11 via synchronous switching elements Q5 and Q6, respectively. In the present embodiment, the synchronous switching elements Q5 and Q6 are p-channel MOSFETs which have their gate terminal connected to the output terminal of a synchronizing signal generator (not shown), and which are driven by each synchronizing signal P1/P2/ . . . /Pn. Zener diodes 31 and 32, resistors 33 and 34, and capacitors 35 and 36 are connected respectively to the lines for the driving signals d1 and d2, and constitute a bias circuit to supply an appropriate bias voltage to the switching elements Q1 and Q2 (p-channel MOFSETs) according to an output of a logic circuit 24 of the control circuit 11 (to be described later).

The discharge lamps La1 to Lan are connected respectively to the secondary sides of the step-up transformers T1 to Tn, one terminals of which are grounded and provided with lamp current detecting units S1 to Sn, respectively. The lamp current detecting units S1 to Sn include respective resistors R1 to Rn and respective diodes D1 to Dn. A lamp current flowing through the discharge lamp La1/La2/ . . . /Lan is converted into a voltage by the resistor R1/R2/ . . . /Rn, and the voltage is outputted to an error amplifier 22 of the control circuit 11 via the diode D1/D2/ . . . /Dn. In the present embodiment, the anode terminals of the diodes D1 to Dn are connected to respective connection portions of the resistors R1 to Rn and the discharge lamps La1 to Lan, and the cathode terminals of the resistors R1 to Rn are connected in common to one terminal of a resistor 37 which has the other terminal grounded, thus what is called "OR circuit" is constituted, whereby a voltage 22b, which corresponds to the largest of the currents flowing through the discharge lamps La1 to Lan, is constantly outputted to the input terminal of the error amplifier 22, and therefore the lamp currents of the plurality of discharge lamps La1 to Lan can be duly controlled.

The control circuit 11 includes an oscillation circuit 21, the aforementioned error amplifier 22, a PWM circuit 23, and the aforementioned logic circuit 24. The control circuit 11 operates as follows. The oscillation circuit 21 is, for example, a CR oscillation circuit, generates a triangular wave 21a with a prescribed frequency according to the values of an external resistor 25 and an external capacitor 26, and feeds to the PWM circuit 23. The error amplifier 22 compares the aforementioned maximum voltage 22 to a reference voltage Vref, and provides the PWM circuit 23 with a voltage 22a corresponding to the error amount. The PWM circuit 23 compares the triangular wave 21a from the oscillation circuit 21 and the voltage 22a from the error amplifier 22, generates a prescribed PWM pulse 23a, and feeds to the logic circuit 24. The logic circuit 24 generates the driving signals d1 to d4 based on the PWM pulse 23a and also on a triangular wave 21b from the oscillation circuit 21, thereby driving the bridge circuit BR1/BR2/ . . . /Brn. Thus, in the discharge lamp lighting apparatus 10, an AC voltage of a prescribed frequency is generated at the primary side of the step-up transformer T1/T2/ . . . /Tn, and the discharge lamp La1/La2/ . . . /Lan connected to the secondary side of the step-up transformer T1/T2/ . . . /Tn is controllably lighted on and off in a highly efficient manner.

In the discharge lamp lighting apparatus 10 according to the present embodiment, the low-side switching elements Q3 and Q4 constituting a bridge circuit are connected to the control circuit 11 via the synchronous switching elements Q5 and Q6, respectively, and the gates of the synchronous switching elements Q5 and Q6 constituted by p-channel MOSFETs are connected to the output terminal of the synchronizing signal generator (not shown) as described above, and are driven by the synchronizing signal P1/P2/ . . . /Pn, whereby the on/off-operations of the synchronous switching elements Q5 and Q6 are controlled by the synchronizing signal P1/P2/ . . . /Pn. Specifically, when the output of the synchronizing signal P1 is at a low level, the synchronous switching elements Q5 and Q6 are turned on, and the switching elements Q3 and Q4 of the bridge circuit BR1 operate normally based on the driving signals d3 and d4 thus putting the bridge circuit BR1 into an operating mode. When the output of the synchronizing signal P1 is at a high level, the synchronous switching elements Q5 and Q6 are turned off, and bias voltages of the driving signals d3 and d4 are not fed to the gates of the switching elements Q3 and Q4 of the bridge circuit BR1 thus putting the bridge circuit BR1 into a non-operating mode. In the discharge lamp lighting apparatus 10, the plurality of bridge circuits Br1 to BR are individually controlled so as to start and stop their operations based on the synchronizing signals P1 to Pn thereby controllably lighting on and off the plurality of the discharge lamps La1 to Lan.

The discharge lamp lighting apparatus 10 may allow the discharge lamps La1 to Lan to be individually lighted on and off for the purpose of reducing power consumption, but is preferably incorporated in a backlight system of an LCD apparatus and conducts a blinking lighting in synchronization with the vertical scanning of the display screen. In this connection, the aforementioned synchronizing signal generator may be included in the discharge lamp lighting apparatus 10 as a constituent element adapted to receive a vertical synchronizing signal from a driving circuit of the LCD apparatus and to generate a synchronizing signal, or may alternatively be included in the driving circuit of the LCD apparatus while a synchronizing signal is externally inputted to the discharge lamp lighting apparatus 10.

Figure 2:
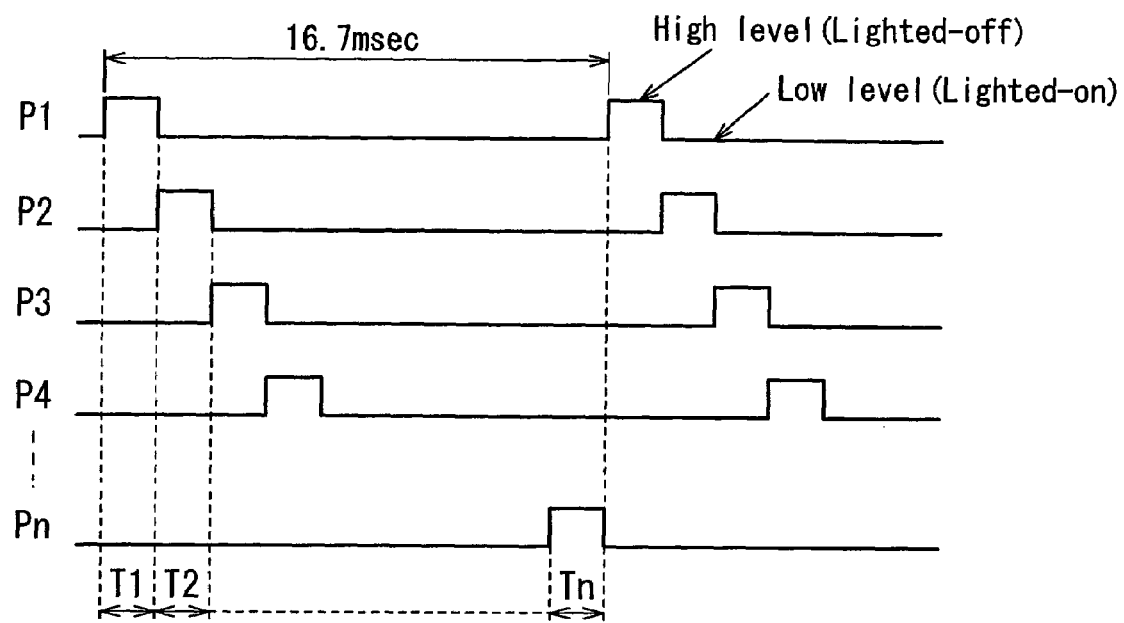
FIG. 2 is a timing chart of an example of synchronizing signals in the discharge lamp lighting apparatus of FIG. 1.
Figure 3:
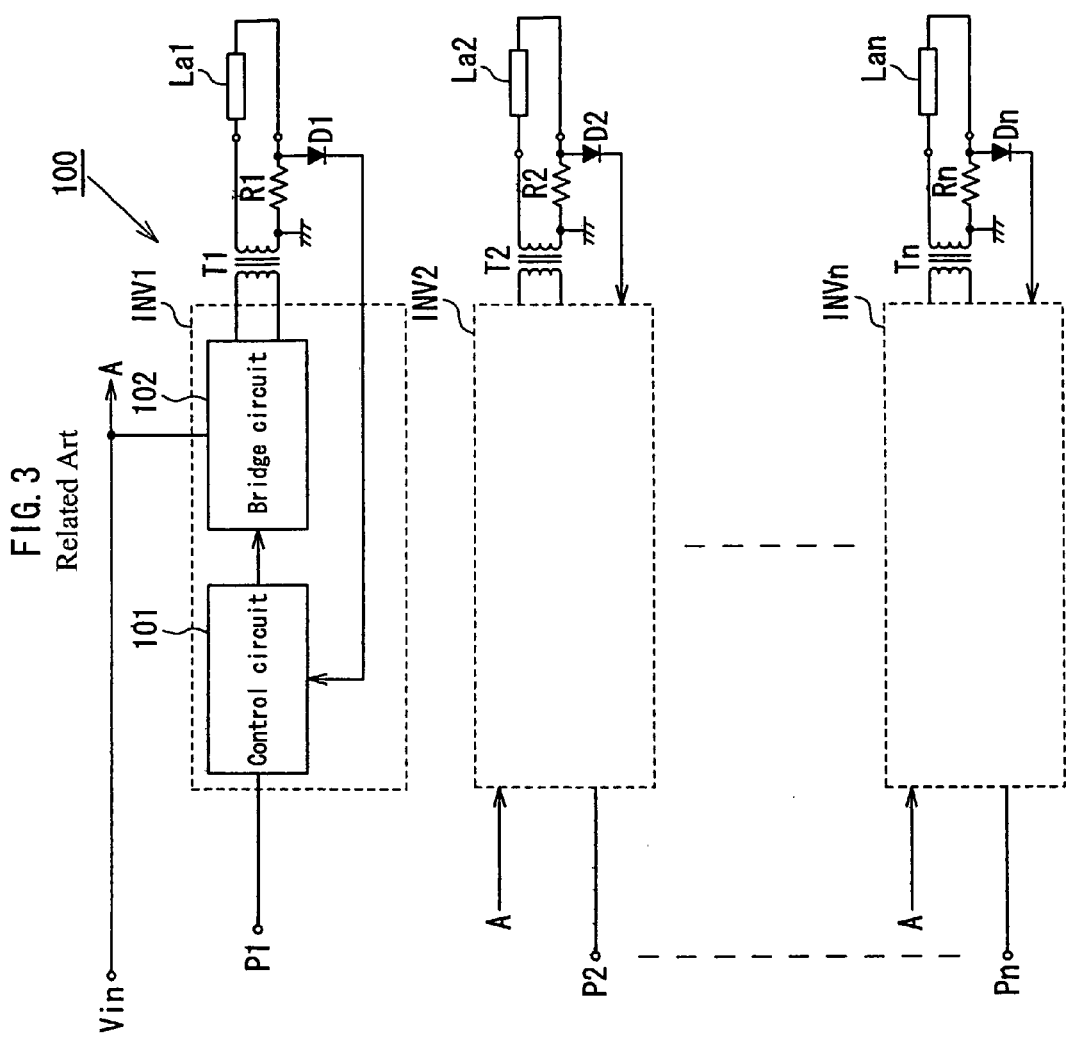
FIG. 3 is a circuitry of a conventional discharge lamp lighting apparatus which employs separate oscillating inverters so as to light on and off a plurality of discharge lamps individually.
Figure 4:
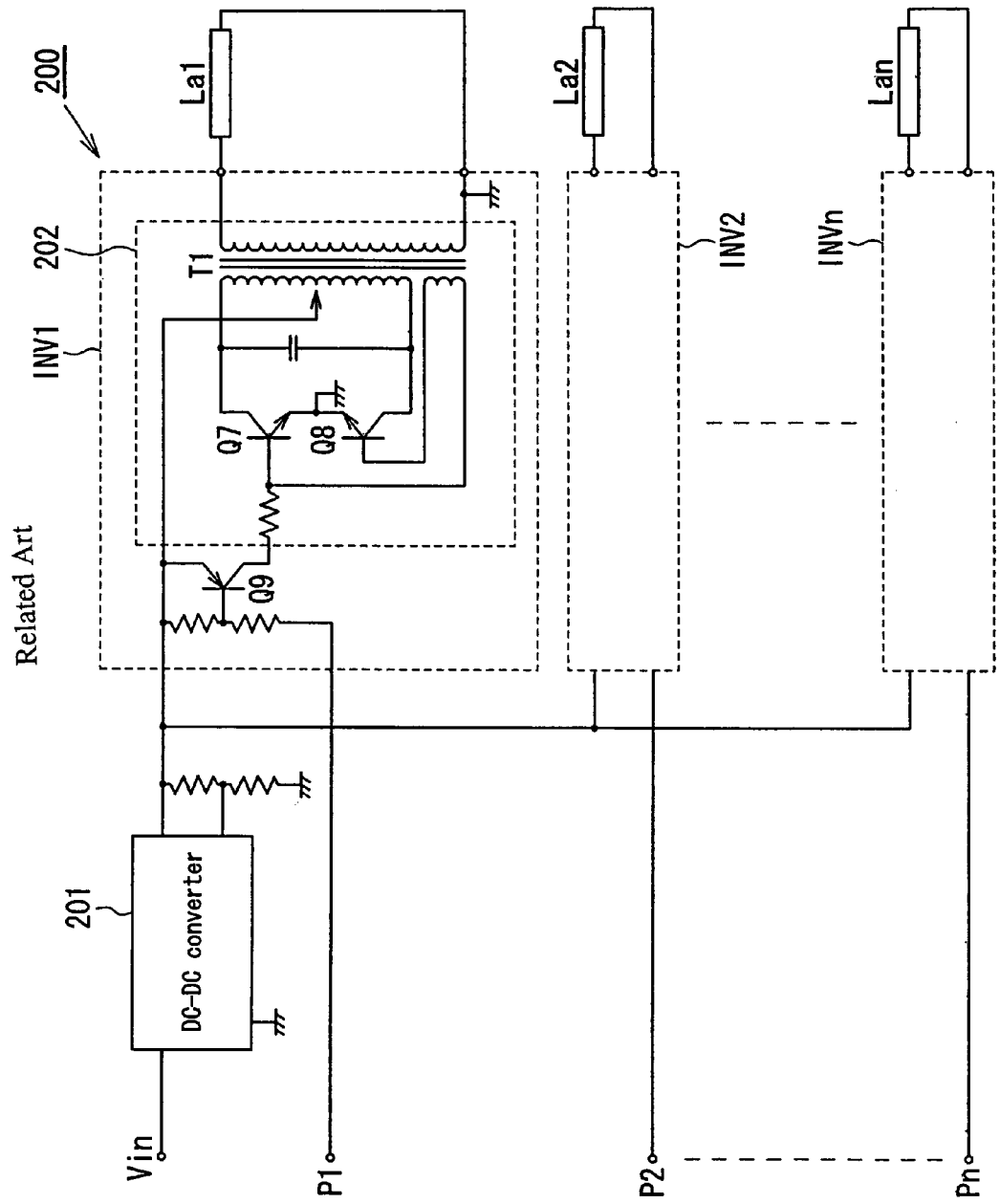
FIG. 4 is a circuitry of another conventional discharge lamp lighting apparatus which employs self oscillating inverters so as to light on and off a plurality of discharge lamps individually.

FIG. 2 is a timing chart showing an example of the synchronizing signals P1 to Pn when a blinking light is performed. In the timing chart, the refresh rate on the screen display is 60 Hz, and 16.7 msec corresponds to one frame period. And, the synchronizing signals P1 to Pn relate to the discharge lamps La1 to Lan, respectively, and the discharge lamps La1 to Lan are arranged parallel to the scanning lines on the LCD screen and correspond to respective partial regions of the screen divided into n pieces of segments. As shown in FIG. 2, in period T1, only the synchronizing signal P1 is at a high level while the remaining synchronizing signals P2 to Pn are at a low level, and the discharge lamp La 1 relating to the synchronizing signal P1 is lighted-off while the remaining discharge lamps La2 to Lan relating respectively to the synchronizing signals P2 to Pn are lighted-on. Then, in period T2, only the synchronizing signal P2 is at a high level while the remaining synchronizing signals P1, and P3 to Pn are at a low level, and the discharge lamp L2 is lighted-off while the remaining discharge lamps P1, and P3 to Pn are lighted-on. Such a lighting-on/off operation continues sequentially during one frame period until period Tn, in which only the discharge lamp Ln is lighted-off while the remaining discharge lamps L1 to Ln-1 are lighted-on, and the operation performed as described above during one frame period is repeated in the subsequent frame periods, whereby each partial region of one frame period is displayed in the next frame period after a certain lighted-off time duration, which results in preventing deterioration in display quality due to blurred outlines. In the timing chart shown in FIG. 2, only one discharge lamp is arranged to be lighted-off at one period T1/T2/ . . . /Tn, but the present invention is not limited to this arrangement, and alternatively a plurality of discharge lamps may be lighted-off at one period by adjusting times in which the synchronizing signals P1 to Pn stay at a high level in consideration of the display quality, power consumption, and the like.

In the above description, the bridge circuits BR1 to BRn are full-bridges, but the present invention is not limited to such a structure, and the bridge circuits BR1 to BRn may alternatively be half-bridges each constituted by two switching elements connected in series to each other. Also, in the bridge circuits BR1 to BRn, the high-side switching elements Q1 and Q3 are p-channel MOSFET's, but the present invention is not limited to such a structure, and the bridge circuits BR1 to BRn may alternatively be totally constituted by n-channel MOSFETs if an appropriate high-side driver is employed. And, all the switching elements may be constituted by any bipolar transistors, insulated gate bipolar transistors (IGBT), and the like.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A discharge lamp lighting apparatus comprising:
a control circuit to output driving signals;
a plurality of step-up transformers; and
a plurality of bridge circuits, each of which is connected to a DC power supply, drives a primary side of each step-up transformer according to the driving signals from the control circuit so as to light each of a plurality of discharge lamps connected respectively to secondary sides of the step-up transformers, and each of which is connected to the control circuit via synchronous switching elements which, according to each of synchronizing signals applied thereto, switch on and off the driving signals from the control circuit so as to controllably cause each of the bridge circuits to start and stop its operation.

2. A discharge lamp lighting apparatus according to claim 1, wherein each of the bridge circuits is a full-bridge circuit comprising series circuits which each include a pair of switching elements connected in series to each other, and which are connected in parallel to each other, and wherein switching elements as low-side switches of each bridge circuit are connected to the control circuit via the synchronous switching elements, respectively.

3. A discharge lamp lighting apparatus according to claim 2, wherein a lamp current detecting unit is provided at the secondary side of each step-up transformer, and an output signal from the current detecting unit is fed to the control circuit via an OR circuit including a diode.

4. A discharge lamp lighting apparatus according to claim 2, wherein the discharge lamp lighting apparatus is incorporated in a backlight system of a liquid crystal display apparatus.

5. A discharge lamp lighting apparatus according to claim 1, wherein a lamp current detecting unit is provided at the secondary side of each step-up transformer, and an output signal from the current detecting unit is fed to the control circuit via an OR circuit including a diode.

6. A discharge lamp lighting apparatus according to claim 5, wherein the discharge lamp lighting apparatus is incorporated in a backlight system of a liquid crystal display apparatus.

7. A discharge lamp lighting apparatus according to claim 1, wherein the discharge lamp lighting apparatus is incorporated in a backlight system of a liquid crystal display apparatus.

8. A discharge lamp lighting apparatus according to claim 7, wherein the plurality of bridge circuits are controlled so as to start and stop operation sequentially in synchronization with vertical scanning lines of the liquid crystal display apparatus.

\* \* \* \* \*